United States Patent
Ronnekleiv

(10) Patent No.: US 7,245,382 B2
(45) Date of Patent: Jul. 17, 2007

(54) DOWNHOLE OPTICAL SENSOR SYSTEM WITH REFERENCE

(75) Inventor: Erlend Ronnekleiv, Trondheim (NO)

(73) Assignee: Optoplan AS, Trondheim (NO)

( * ) Notice: Subject to any disclaimer, the term of this patent is extended or adjusted under 35 U.S.C. 154(b) by 338 days.

(21) Appl. No.: 10/693,619

(22) Filed: Oct. 24, 2003

(65) Prior Publication Data

US 2005/0088660 A1    Apr. 28, 2005

(51) Int. Cl.
G01B 9/02 (2006.01)
(52) U.S. Cl. ........................................... 356/477
(58) Field of Classification Search ............... 356/477, 356/478, 479; 250/227.23, 227.18, 227.19, 250/227.27, 227.11; 385/12
See application file for complete search history.

(56) References Cited

U.S. PATENT DOCUMENTS

| 5,227,857 | A  | * | 7/1993 | Kersey ..................... 356/477 |
| 5,721,615 | A  |   | 2/1998 | McBride et al. |
| 6,403,949 | B1 | * | 6/2002 | Davis et al. ............ 250/227.27 |
| 6,522,797 | B1 | * | 2/2003 | Siems et al. .................. 385/12 |

OTHER PUBLICATIONS

Canadian Office Action, Application No. 2,485,030, dated Mar. 23, 2006.

* cited by examiner

*Primary Examiner*—Gregory J. Toatley, Jr.
*Assistant Examiner*—Marissa J. Detschel
(74) *Attorney, Agent, or Firm*—Patterson & Sheridan, LLP

(57) ABSTRACT

Embodiments of the present invention generally provide methods, apparatus, and systems for compensating for frequency fluctuations in source light used to interrogate an optical sensor. The optical sensor may be interrogated to generate a sensor signal. A reference device co-located with the optical sensor may also be interrogated to generate a reference signal. Optical parameters extracted from the reference signal may be used to correct parameters extracted from a sensor signal.

31 Claims, 5 Drawing Sheets

DOWNHOLE OPTICAL SENSOR SYSTEM WITH REFERENCE

BACKGROUND OF THE INVENTION

1. Field of the Invention

Embodiments of the present invention generally relate to optical sensing systems and, more particularly, to compensating for frequency fluctuations in source light used to interrogate optical sensors.

2. Description of the Related Art

Optical sensors can offer numerous advantages over conventional electrical and/or electromechanical sensing devices. For example, optical sensors typically have greater resistance to electromagnetic interference (EMI) than other types of sensors. Additionally, optical sensors tend to be small, lightweight, and physically robust. Consequently, optical sensors are commonly used in applications requiring resistance to a variety of harsh environmental conditions, such as downhole sensing applications.

Most optical sensors operate under the same basic principles. A sensitized region along an optical fiber is exposed to an environmental condition that modulates a light signal transmitted within the optical fiber. The modulation alters one or more parameters of the light transmitted within the optical fiber, such as amplitude, power distribution versus frequency/wavelength, phase, or polarization. Modulated light emerging from the fiber is analyzed to determine values indicative of the environmental condition. A wide variety of parameters may be measured using fiber-optic sensing techniques, such as strain, displacement, velocity, acceleration, flow, corrosion, chemical composition, temperature, and pressure, among others.

A fiber-optic interferometer sensor may be used to detect changes in light affected by an environmental condition as the light propagates along an optical fiber. A fiber-optic interferometer is typically formed by two reflectors, each placed at the end of a different optical path. One of the fiber-optic paths may be exposed to an environmental condition that alters a parameter of light transmitted through that path. Reflected light from each path may be recombined to mix coherently, thereby forming a "fringe" signal which is directly related to the difference in optical path lengths (i.e., the products of refractive index and physical length of the different paths). The fringe signals may be analyzed and correlated with the magnitude of the environmental condition. Fiber-optic interferometer sensors are typically used in applications where very sensitive measurements are required.

A Bragg grating sensor is an intrinsic optical sensor that operates by modulating the wavelength of a light field transmitted through an optical waveguide. A Bragg grating sensor comprises a tuned optical filter, or "Bragg grating", imprinted upon the core of an optical waveguide coupled to a broadband light source. The Bragg grating is structured to reflect light within a narrow bandwidth centered at a Bragg wavelength corresponding to the spacing of the Bragg grating. If the Bragg grating sensor is strained, for example by stress or vibration, the Bragg grating spacing changes. This results in a shift in the reflected light wavelength, which can be measured and correlated with the magnitude of the stress or vibration. Bragg gratings may be paired within a length of optical fiber to form an FBG interferometer sensor. An FBG interferometer sensor generally provides greater sensitivity to strain changes in a length of optical fiber than a sensor utilizing a single Bragg grating.

Examples of an optical Bragg grating sensor are described in U.S. Pat. No. 6,422,084, entitled "Bragg Grating Pressure Sensor", issued Jul. 23, 2002 to Fernald, et al.; and U.S. Pat. No. 6,452,667, entitled "Pressure Isolated Bragg Grating Temperature Sensor", issued Sep. 17, 2002, to Fernald, et al., all of which are hereby incorporated by reference in their entireties.

Optical sensors have become increasingly popular in the petroleum industry due to their resistance to interference and tolerance for harsh environmental conditions. For example, optical sensors may be used as gravity meters in petroleum exploration to measure minute changes in the earth's gravitational field. Alternatively, optical sensors may be used as hydrophones in a water environment to measure shock waves reflected from hidden rock layers as part of a seismic survey process. Optical sensors are also used to monitor conditions within a well during or after drilling operations have been performed. For instance, optical sensors may be used in a well logging operation to take measurements of rock formations within a borehole. Alternatively, optical sensors may be used in drill-stem testing operations where pressure variations within a borehole are measured to determine the presence of oil reservoir rock in the surrounding strata.

As discussed above, an optical sensor may modulate the phase of light emitted by a light source responsive to an environmental condition. However, instabilities in the frequency of an interrogating light signal arriving at an optical sensor from a light source may cause variations in sensor signals. For example, fluctuations in the frequency of an interrogating light signal arriving at an interferometer or Bragg grating sensor may cause variations in the reflected light signal emitted by the sensor, resulting in undesirable noise.

Fluctuations in the frequency of an interrogating light signal arriving at an optical sensor are oftentimes due to light source output instabilities. However, in many environments, achieving a stable light source output is extremely difficult. For example, oil platforms and ships typically contain propulsion engines, diesel engine generators, hoisting systems, pumps, thrusters, and other such devices that generate significant vibrations during operation. A light source generally must be isolated from vibrations in order to obtain a light frequency output sufficiently stable to obtain accurate readings from typical Bragg grating and fiber-optic interferometer sensors. Consequently, in these and other vibration prone environments, damping units have been used to isolate light sources from low frequency vibrations, typically in the range of 1–100 Hz. However, low frequency damping units are expensive to build, very heavy, and oftentimes insufficient to completely eliminate vibration induced source frequency fluctuations.

Fluctuations in the frequency of an interrogating light signal arriving at an optical sensor may also be caused by changes to the light signal as it travels from a light source through an optical fiber to the sensor. For example, strain on an optical fiber due to environmental vibrations, pressure, and/or temperature changes may cause Doppler-shift effects, resulting in frequency fluctuations in a light signal passing through the optical fiber. Other environmental conditions may adversely affect the frequency of light emitted by a light source. For example, changes in the ambient bulk temperature and/or current applied to a light source may cause changes in a laser light source cavity, resulting in frequency fluctuations.

As discussed above, frequency fluctuations due to light source instabilities and/or changes to a light signal traveling through an optical fiber may result in sensor output variations and unwanted noise. These effects may significantly impair the accuracy and repeatability of an optical sensor system. In applications such as oil exploration and/or oil well monitoring, these effects may significantly increase the cost of drilling and oil extraction. In addition to frequency fluctuations, other parameters that may affect sensor accuracy are environmental parameters, such as temperature and acceleration, that affect the optical signal received from interrogated sensors.

One approach to compensate for such parameters is to utilize reference sensors (references) that are located at or near the measuring sensors (sensors) and, thus, subjected to the same environmental conditions. For example, U.S. Pat. No. 6,522,797, entitled Seismic Optical Acoustic Recursive Sensor System describes a time division multiplexed (TDM) interrogated marine seismic interferometric sensor array that employs reference interferometers that are co-located with the sensor interferometers and, therefore, should be subjected to the same temperature and acceleration. However, the reference interferometers may be made insensitive to parameters measured by the interferometer sensors (acoustic pressure in this case). The referenced patent describes a method for removing sensor sensitivity to temperature and acceleration by subtracting fringe signals received from the reference interferometers from corresponding signals received from the sensor interferometers. One problem with this approach, however, is that the sensor interferometers are still sensitive to both source frequency fluctuations and lead fiber length fluctuations.

Accordingly, there is a need to eliminate or reduce the effects of frequency fluctuations in an interrogating light signal arriving at an optical sensor in order to improve sensor accuracy and repeatability.

DETAILED DESCRIPTION

Figure 1:
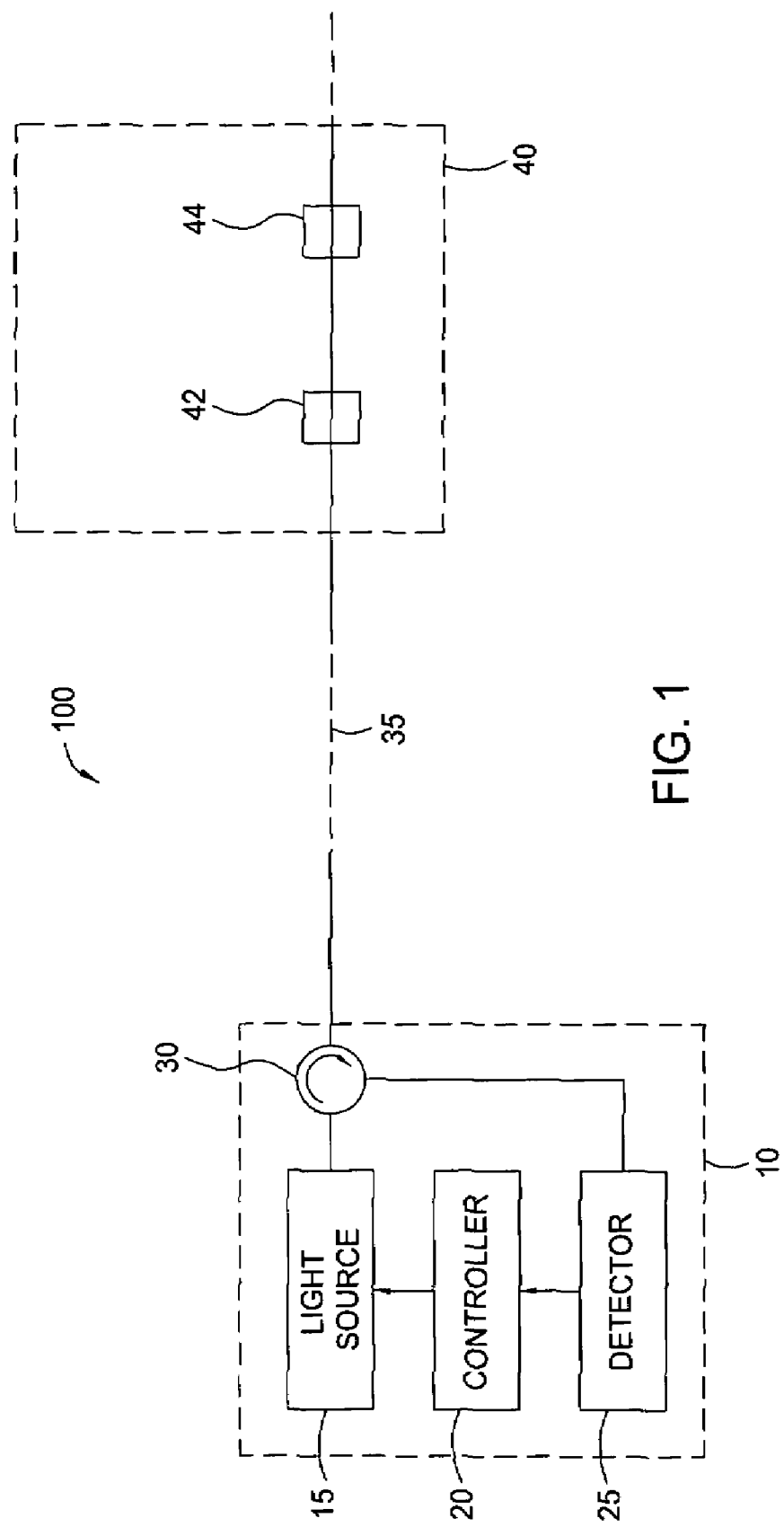
FIG. 1 is a schematic block diagram of an optical sensor system in accordance with embodiments of the present invention.

Embodiments of the present invention provide improved optical sensor systems and methods for eliminating or reducing the effects of frequency fluctuations in an interrogating light signal used to illuminate optical optical sensors such as Bragg grating sensors and optical interferometer sensors. The frequency fluctuations may be due to light source instabilities, changes to a light signal traveling through an optical fiber (or any other type optical waveguide) to a sensor, and/or other environmental conditions and effects. Interrogating light signal frequency fluctuations may result in optical sensor output variations and unwanted noise. However, embodiments of the present invention may be used to improve the accuracy and repeatability of optical sensor systems by allowing for the correction of frequency fluctuations through the use of reference devices co-located with sensors. Embodiments of the present invention may offer numerous advantages over prior art optical sensor systems. For example, embodiments of the present invention may significantly reduce the need to isolate a light source from environmental vibrations. Additionally, embodiments of the present invention may enable the use of a light source with less stringent frequency stability specifications.

A reference device may be used to correct for frequency fluctuations in an interrogating light signal due to light source instabilities. The reference device may comprise a Bragg grating formed in a fiber (i.e., an FBG) or other type optical waveguide, an interferometer or other type of optical sensor. The effects of light source induced interrogating light signal frequency fluctuations between measurement samples may be minimized or eliminated by interrogating the reference device and sensor with the same light source. The resultant reference and sensor signals may be sampled and processed to generate a sensor signal that is compensated for light source induced fluctuations in the interrogating light signal frequency.

A reference device co-located with a sensor may also be used to correct for Doppler shift induced frequency fluctuations within an interrogating light signal arriving at or returning from an interferometer sensor. Doppler shift effects may be minimized or eliminated by interrogating the reference device and sensor with light signals through a common optical pathway or different optical pathways exposed to substantially similar environmental conditions. In either case, the resultant reference and sensor signals may be sampled and processed to generate a sensor signal that is compensated for Doppler shift induced interrogating light signal frequency fluctuations. Further, in a downhole optical sensor system, positioning the sensor and the reference device in close proximity to each other may be advantageous in that environmental vibrations are generally much smaller within a borehole than in a surface environment, such as a ship or drilling platform. Consequently, isolating the reference device from vibrations in the borehole may be more easily achieved.

To facilitate understanding, embodiments of the present invention may be described with reference to optical fiber-based sensors and systems. However, those skilled in the art will recognize that the techniques described herein may more generally be applied to optical systems and sensors that are not necessarily fiber based, but utilize other types of optical waveguides. Generally, the optical waveguides will have a at least one core surrounded by a cladding material, and may be similar in construction to optical waveguides disclosed in the U.S. Pat. No. 6,519,388 entitled "Tube-Encased Fiber Grating", which is incorporated herein by reference.

FIG. 1 is a schematic block diagram of an exemplary optical sensor system 100 in accordance with embodiments of the present invention. The system 100 comprises an instrumentation unit 10 coupled to a bi-directional light path, such as an optical fiber 35, or other type optical waveguide. As illustrated, the instrumentation unit 10 may comprise a light source 15, a controller 20, and a detector 25. The controller 20 may be any suitable processing equipment generally configured to generate signals to control the light source 15 and process signals received from detector 25 as described herein. The light source 15 and detector 25 may also be coupled to a coupler 30 (e.g., a circulator) generally configured to direct downstream light from light source 15 into fiber 35 and direct upstream light from fiber 35 into detector 25. The detector 25 may include any suitable components configured to convert light signals received from the coupler 30 to electrical signals suitable for processing by the controller 20.

A reference device 42 and a sensor 44 (e.g., a device sensitive to one or more measured parameters) may be coupled to fiber 35 downstream of circulator 30. As shown, the reference device 42 and the sensor 44 may be located remotely from instrumentation unit 10 in order to measure one or more environmental conditions at a remote location 40. For example, the remote location 40 may represent a location within a wellbore (such as a deep sea wellbore), while the instrumentation unit 10 may be located at the wellbore surface (e.g., a ship or drilling platform) as part of a well logging operation, for example, to take measurements of rock formations within the borehole. The reference device 42 and sensor 44 may be located in close proximity to each other, such that they are each exposed to substantially the same environmental conditions. However, the reference device 42 is preferably made insensitive to the parameter or parameters measured by the sensor 44.

Figure 2:
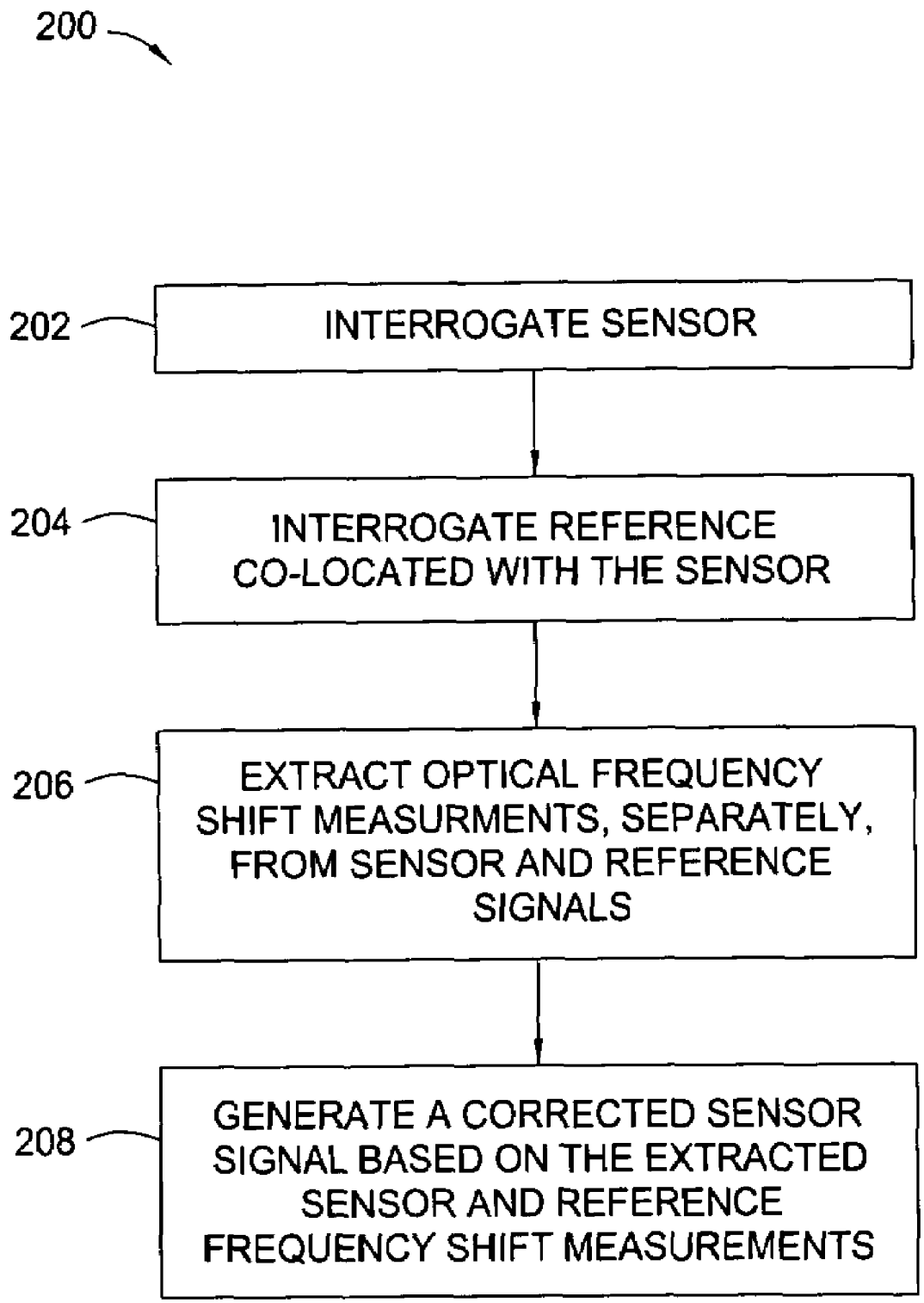
FIG. 2 is a flow diagram of exemplary operations for interrogating an optical sensor in accordance with embodiments of the present invention.

Operation of the various components of system 100 may best be described with reference to FIG. 2, which is a flow diagram of exemplary operations 200 that may be performed to measure a parameter via the sensor 44. The operations 200 begin, at step 202, by interrogating the sensor 44, for example, with a pulse of light from light source 15. While only one sensor 44 is shown, it should be understood that the system 100 may actually include any number of sensors 44 (e.g., a sensor array) and/or reference devices 42 that may be interrogated using any suitable multiplexing technique, such as time division multiplexing (TDM), wavelength division multiplexing (WDM), and the like.

As previously described, frequency fluctuations (e.g., caused by fluctuations in the source frequency from light source 15 or by Doppler shift) may cause errors in the signal received from the sensor 44. However, as the reference 42 is co-located with the sensor 44 and may also be interrogated by the same light source 15, the reference 42 should be subjected to substantially similar frequency fluctuations and may, therefore, be used to compensate a signal received from the sensor 44, as described in greater detail below.

At step 204, the reference 42 co-located with the sensor 44 is interrogated. At step 206, separate optical frequency shift measurements are extracted from signals received from the sensor 44 and reference 42, in response to the interrogation. As will be described in greater detail below, the exact optical frequency parameter extracted as the optical frequency shift measurement may vary, for example, depending on the exact types of devices utilized for the sensor 44 and reference 42. At step 208, a corrected sensor signal is generated based on the extracted sensor and reference frequency shift measurements. Thus, by separately extracting frequency shift information from the sensor 44 and reference device 42, a corrected sensor signal that is generally insensitive to frequency fluctuations may be generated.

Various types of devices may be used for the reference 42 and sensor 44, and the exact method of interrogation, as well as the exact type of optical frequency parameter extracted from the reference and sensor signals may depend on the types of devices used. For example, for some embodiments, distributed lasers or fiber Bragg gratings (FBGs) may be utilized and the optical frequency shift measurements extracted from the sensor and reference may include absolute laser frequencies, separation between laser frequencies, or FBG center frequencies. Further, for some embodiments, interferometer devices (e.g., Mach-Zehnder, Michelson, Fabry-Perot, polarimetric, or any other type interferometer) may be used for sensors and/or references and the optical frequency shift measurements extracted from the sensor and reference signals may include the signal phases.

Figure 3A:
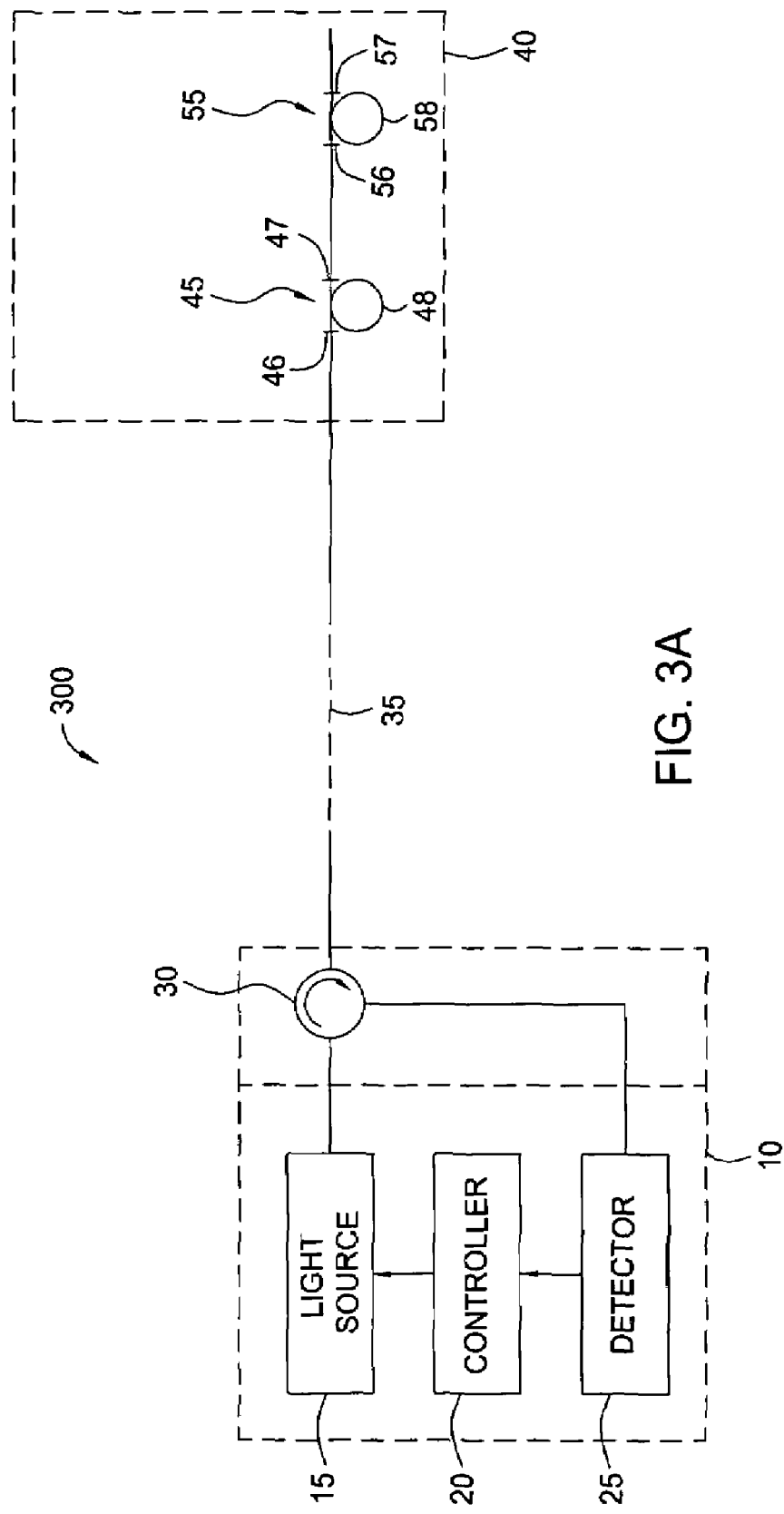
FIGS. 3A and 3B are schematic block diagrams of interferometer-based optical sensor systems in accordance with embodiments of the present invention.

For example, FIG. 3A illustrates a sensing system 300 utilizing a reference interferometer 45 and a sensor interferometer 55. As illustrated, the reference interferometer 45 may be formed by a pair of reflectors, such as FBGs 46 and 47, separated by a length of fiber 48. Similarly, the sensor interferometer 55 may be formed by a pair of reflectors, such as FBGs 56 and 57, separated by a length of fiber 58. As previously described, interferometers may be used to sense parameters that affect fringe signals caused by light reflected by the corresponding reflector pairs.

In other words, the FBGs of each interferometer are separated by a distance L and, therefore, the light reflected from the second FBG (e.g., 47 or 57) will be delayed relative to that reflected from the second FBG (e.g, 46 or 56) by a delay $\tau$, commonly referred to as the interferometer imbalance, according to the following equation:

$$\tau = 2L \cdot n/c \qquad (1)$$

where n is the refractive index of the fiber and c is the vacuum speed of light. The phase of the signal reflected from the interferometer ($\phi_{IF}$) depends both on the imbalance $\tau$ and the interrogating frequency $\nu$, according to the following equation:

$$\phi_{IF} = 2\lambda\nu\tau \qquad (2).$$

Thus, measurements of $\phi_{IF}$ will reveal information about any changes in L or n, for instance due to strain or temperature changes, provided that fluctuations in $\nu$ are either small or known so that they can be corrected for. In other words, by measuring changes in interferometer phase, changes in parameters that modulate L or n may also be measured.

As previously described, the reference interferometer 45 may be made insensitive to parameters measured by the sensor interferometer 55, for example, by isolating the length of fiber 48 separating the FBGs 46 and 47 from the measured parameters, while still exposing the reference interferometer 45 and sensor interferometer 55 to the same sources of frequency fluctuations. For example, depending on the parameter sensed by the sensor interferometer 55, the reference interferometer 45 may be housed in a package that shields it from pressure, compensates for temperature changes, and the like.

Figure 3B:
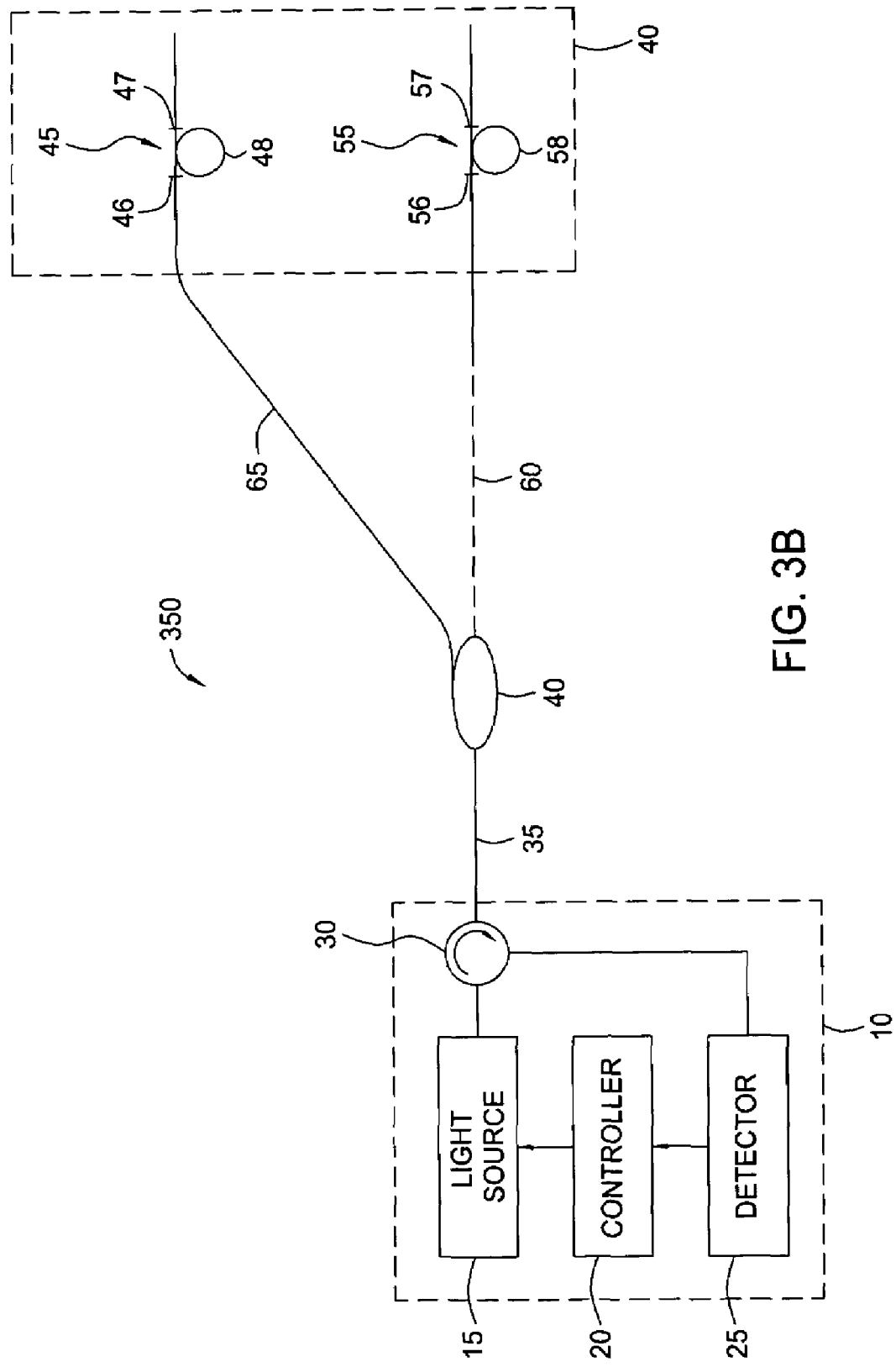

As illustrated, for some embodiments, the reference interferometer 45 and sensor interferometer 55 may be deployed on a common lead fiber 35. While not shown, it should be understood that any number of reference and sensor interferometers may be deployed on a common lead fiber, provided a reference interferometer is exposed to the substantially similar frequency fluctuations as a corresponding sensor interferometer. Further, as illustrated in the sensing system 350 of FIG. 3B, the reference interferometer 45 and sensor interferometer 55 may be deployed in the remote location 40 on separate fibers 65 and 60, respectively, coupled to a common lead fiber 35 via a coupler 70. However, the reference interferometer 45 may still be placed in close proximity to the sensor interferometer 55 to ensure the separate lead fibers 60 and 65 are subjected to substantially the same frequency fluctuations.

Figure 4:
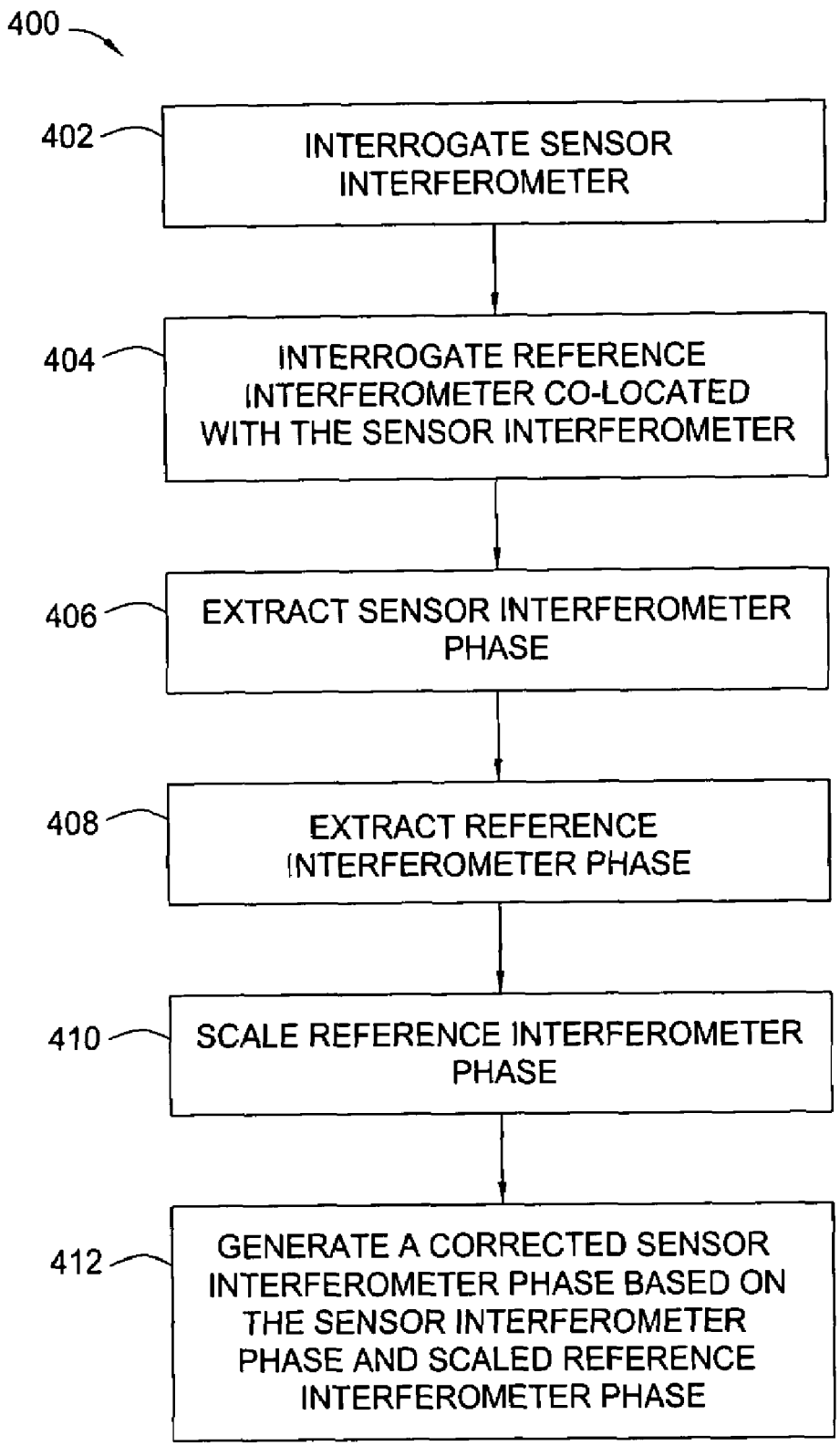
FIG. 4 is a flow diagram of exemplary operations for interrogating a sensor interferometer in accordance with embodiments of the present invention.

Operation of sensing systems utilizing reference interferometers, such as systems 300 and 350, may best be described with reference to FIG. 4, which is a flow diagram of exemplary operations 400 that may be performed to measure a parameter via the sensor interferometer 55. It may be noted that the operations 400 are similar to the operations 200, but are more specific to systems utilizing reference and sensor interferometers. The operations 400 begin by interrogating the sensor interferometer 55 and reference interferometer 45, at steps 402 and 404, respectively.

At step 406, the phase of the signal received from the sensor interferometer 55 is extracted and, at step 408, the phase of the signal received from the reference interferometer 45 is extracted. At step 410, the reference interferometer phase is scaled, using a suitable scaling factor which may be chosen for a particular application (as described in greater detail below). At step 412, a corrected sensor interferometer phase is generated based on the sensor interferometer phase and the scaled reference interferometer phase.

Various methods may be utilized to derive the phase delays of the sensor interferometer 55 and reference interferometer 45. For example, some methods utilize a pre-compensating interferometer (to control the delay between pulses from light source 15 delivered to the interrogated interferometers) or a post-compensating interferometer in the detector 25 to create interference between pulses received from the interrogated interferometers). An advantage of using compensating interferometers is that the demodulated interference phase from the interrogated interferometers can be made insensitive to fluctuations in the center frequency $v$ of the light source 15, thus allowing for the use of less stable (and possibly less expensive) optical source. This is achieved by choosing the imbalance (difference in propagation delay between the short and the long path) of the compensating interferometer approximately equal to the imbalance of the interrogated interferometer. Thus the total imbalance of the interfering signals at the detector becomes approximately zero ensuring low sensitivity to source frequency fluctuations.

The demodulated signals will, however, be sensitive to fluctuations in the (pre or post) compensating interferometer delay. Such fluctuations may be caused, for example, by vibrations or temperature fluctuations imposed on the compensating interferometer. Furthermore, the sensitivity to lead fiber delay fluctuations is not removed by the use of compensating interferometers. Systems employing pre-compensating interferometers will be sensitive to fluctuations in the down-lead fiber delay ($t_d$). Such fluctuations will effectively stretch or compress the optical signals in the time domain by the factor $(1+dt_d/dt)$ as they propagate in the down-lead fiber. Similarly, systems employing post-compensating interferometers will be sensitive to fluctuations in the up-lead fiber delay ($t_u$). Such fluctuations will stretch or compress the optical signals in the time domain by the factor $(1+dt_u/dt)$ as they propagate in the up-lead fiber. Such stretching or compression of the time axis is equivalent to a Doppler shift which can be represented by a compression or stretching of the optical frequency axis by the factor $1/(1+dt_d/dt)$ in the down-lead fiber case or by the factor $1/(1+dt_u/dt)$ in the up-lead fiber.

If a pre-compensating interferometer with delay $\tau_{pre}$ is used, the demodulated interference phase from interrogated interferometer i ($\phi_i$) calculated, for example, by the controller 20 will be:

$$\phi_i = 2\pi v(\tau_i - \tau_{pre} + \tau_i dt_d/dt), \quad (3)$$

where $\tau_i$ is the imbalance of the interrogated interferometer. Similarly, if a post-compensating interferometer with delay $\tau_{post}$ is used, the demodulated interference phase of the interrogated interferometer will be $$\phi_i = 2\pi v(\tau_i - \tau_{post} - \tau_{post} dt_u/dt). \quad (4)$$

However, embodiments of the present invention may remove unwanted sensitivity to fluctuations in $\tau_{pre}$, $\tau_{post}$, $t_d$, or $t_u$ from the sensor interferometer phase ($\phi_s$) based on the phase of the reference interferometer ($\phi_r$). In other words, as previously described, the corrected phase of the sensor interferometer ($\phi_s^{corr}$) may then be calculated by the controller 20 as:

$$\phi_s^{corr} = \phi_s - k_s \phi_r. \quad (5)$$

where $k_s$ is the reference interferometer phase scaling factor, which may vary according to different embodiments. For example, in embodiments with approximately equal sensor and reference interferometer imbalances ($\tau_s \approx \tau_r$), no scaling ($k_s=1$) may be used. If a pre-compensating interferometer is used, this will ensure that the readout becomes insensitive to both $\tau_{pre}$ and to $dt_d/dt$, provided that the down-lead fiber delay fluctuations are the same for the sensor and the reference interferometers. Similarly, if a post-compensating interferometer is used the readout will be insensitive to both $\tau_{post}$ and $dt_u/dt$, provided that the up-lead fiber delay fluctuations are the same for the sensor and the reference.

In embodiments with different sensor and reference interferometer imbalances ($\tau_s \neq \tau_r$) insensitivity to fluctuations in the compensating interferometer delay and the lead fiber delays may still be achieved if a post-compensating interferometer is used, by choosing a scale factor as ratio of the sensor and reference imbalances (e.g., $k_s = \tau_s/\tau_r$). However, if a pre-compensating interferometer is used, the same choice for $k_s$ will produce insensitivity to $dt_d/dt$, but some sensitivity to $\tau_{pre}$. Alternatively, insensitivity to $\tau_{pre}$ with some sensitivity to $dt_d/dt$ may be achieved with no scaling ($k_s=1$). Of course, intermediate scaling values (e.g., between 1 and $\tau_s/\tau_r$) may also be used, resulting in some, albeit reduced, sensitivity to both $\tau_{pre}$ and $dt_d/dt$. Therefore, a post-compensating interferometer design may be preferred to a pre-compensating interferometer design for embodiments where sensor and reference interferometer imbalances cannot be made approximately equal, while sensitivities to both compensating interferometer delays and to lead fiber delays are of concern.

The sensor interferometer phase correction equation (5) may also be used to remove sensitivity to lead fibers and compensating interferometer delays if the sensor and reference interferometers are interrogated at different optical frequencies, employing wavelength division multiplexing (WDM). For example, in such embodiments, the scaling factor $k_s$ may be adjusted by multiplication with the ratio of the sensor frequency to the reference frequency ($v_s/v_r$), since the sensitivity of the phase to delay fluctuations is proportional to the interrogating optical frequency.

Alternative techniques for deriving the phase delays of the sensor and reference interferometers that do not employ compensating interferometers may also be utilized. Such techniques are typically highly sensitive to fluctuations in the source frequency, as well as to Doppler shift in the down-lead fiber. However, errors due to both types of sensitivities may be removed utilizing the demodulated phase from a reference interferometer to correct the demodulated phase from a sensor interferometer, as described herein (e.g., with $k_s = \tau_s/\tau_r$). One example of such a technique detects phase shifts utilizing a phase generated carrier (PGC), as described in A. Dandridge, A. B. Tveten, and T. G. Giallorenzi, "Homodyne demodulation scheme for fiber optic sensors using phase generated carrier", IEEE J. Quantum Electronics, Vol. QE-18, pp. 1647–1653, 1982.

Regardless of the exact technique and type of sensors employed (interferometric, Bragg grating, laser sensors), if the sensor and reference devices are interrogated at different optical frequencies, employing wavelength division multiplexing, the scaling factor $k_s$ may be adjusted by multiplication with the ratio of the sensor frequency to the reference frequency, as previously described. While the correction formula (5) may not remove errors due to source frequency fluctuations (as the reference and sensor are interrogated at different frequencies), other methods may be utilized to keep such errors at an acceptable level (e.g., utilizing vibration damping).

As previously described with reference to FIGS. 1 and 2, the techniques described herein may also be applied to systems with sensor and reference devices other than interferometers. For example, remotely pumped laser sources such as fiber distributed lasers may be used as sensor elements. The lasers may typically be pumped optically through a down-lead fiber, while signals generated by the sensor lasers are transmitted through an up-lead fiber to an interrogation unit (e.g., detector 25) which monitors the absolute frequency of each laser mode and/or the separation between the laser frequencies. The utilization of fiber distributed lasers is described in detail in U.S. Pat. No. 5,844,927, entitled "Optical Fiber Distributed Feedback Laser," assigned to Optoplan AS.

Rather than extracting phase information, as with the interrogated interferometers, frequency information may be extracted from the generated laser signals. For example, as described in the above-referenced U.S. Pat. No. 5,844,927, measurement of changes in one laser mode frequency may provide information about one or more parameters that change the strain or temperature of the corresponding laser, and the laser can thus be used as a sensor for those properties. Further, measurement of frequency separation between two polarization modes of a laser provides information about parameters that change the birefringence of the corresponding laser, and a laser can thus also be used as a sensor for those properties. When a sensor laser signal propagates through the up-lead fiber, the frequency of this signal may experience a Doppler shift due to fluctuations in the up-lead fiber delay $dt_u/dt$. This Doppler shift may cause errors in the measured frequency, and thus in the readout sensor signal.

Utilizing the techniques described herein, a reference laser element with low sensitivity to environmental fluctuations which is co-located with the sensor lasers, and which uses at least part of a common up-lead fiber as the sensor lasers, may be used to correct these errors. In other words, errors due to Doppler shift in the up-lead fiber may then be removed by effectively subtracting the reference laser frequency multiplied by a suitable scaling factor (e.g., the ratio of the sensor frequency to the reference frequency) from the sensor laser frequency. In a similar manner, a reference FBG may be used to correct a signal from a co-located sensor FBG. For example, a center frequency of the reference FBG may be scaled and subtracted from a center frequency of the sensor FBG.

According to embodiments of the present invention, reference devices co-located with sensors may be utilized to reduce the sensitivity of a variety of fiber optic sensing systems to frequency fluctuations in interrogating light signals. The frequency fluctuations may be caused by fluctuations in the interrogating light source and/or a Doppler shift in an optical path to and/or from the sensors. By removing sensitivity to frequency fluctuations, more accurate sensor readings may be taken. Further, by removing sensitivity to source frequency fluctuations, a light source with less stringent frequency stability specifications may be utilized, which may reduce system complexity and cost.

Although several embodiments which incorporate the teachings of the present invention have been shown and described in detail, those skilled in the art can readily devise many other varied embodiments that still incorporate these teachings.

What is claimed is:

1. A method for sensing, comprising:
   interrogating at least one optical sensor with a light source;
   interrogating with the light source at least one optical reference device located in close proximity with the optical sensor such that the optical sensor and the reference device are exposed to substantially equal environmental conditions;
   extracting a sensor optical frequency parameter from a signal received from the sensor;
   extracting a reference optical frequency parameter from a signal received from the reference device;
   generating a corrected sensor optical frequency parameter based on the sensor and reference optical frequency parameters;
   calculating at least one measurand based on the corrected sensor optical frequency parameter; and
   providing a reading of the calculated at least one measurand, wherein the optical sensor is sensitive to the at least one measurand and the reference device is insensitive to the at least one measurand.

2. The method of claim 1, further comprising:
   scaling the reference optical frequency parameter; and
   wherein generating the corrected sensor optical frequency parameter comprises generating the corrected sensor optical frequency parameter based on the scaled reference optical frequency parameter and the sensor optical frequency parameter.

3. The method of claim 2, wherein scaling the reference optical frequency parameter comprises multiplying the reference optical frequency parameter by a scaling factor based on a ratio of a frequency of a light signal used to interrogate the sensor and a frequency of a light signal used to interrogate the reference device.

4. The method of claim 1, wherein at least one of the optical sensor and the reference device comprises an optical waveguide Bragg grating.

5. The method of claim 4, wherein the optical sensor and the reference device each comprise a Bragg grating optically coupled to a common lead waveguide.

6. The method of claim 5, wherein at least one of the sensor optical frequency parameter and the reference optical frequency parameter comprises a change in an optical waveguide Bragg grating center frequency.

7. The method of claim 1, wherein at least one of the optical sensor and the reference device comprises a sensor laser and at least one of the sensor optical frequency parameter and the reference optical frequency parameter comprises at least one of a laser frequency or a separation in laser frequencies.

8. The method of claim 1, further comprising locating the at least one optical sensor and the at least one optical reference device in a wellbore.

9. A method for sensing at least one parameter comprising:
   interrogating a sensor interferometer to generate a sensor signal responsive to the parameter;

interrogating a reference interferometer located in close proximity with the sensor interferometer, such that the reference interferometer and the sensor interferometer are exposed to substantially equal environmental conditions, to generate a reference signal insensitive to the parameter;

extracting a sensor phase from the sensor signal;

extracting a reference phase from the reference signal;

generating a corrected sensor phase based on the sensor phase and the reference phase;

calculating the at least one parameter based on the corrected sensor phase; and providing a reading of the calculated at least one parameter.

10. The method of claim 9, wherein the sensor interferometer and reference interferometer share a common lead optical waveguide.

11. The method of claim 9, wherein generating a corrected sensor phase based on the sensor phase and the reference phase comprises:

scaling the reference phase; and generating the corrected sensor phase based on the sensor phase and the scaled reference phase.

12. The method of claim 11, wherein:

the sensor interferometer and reference interferometer are interrogated with light signals of different frequencies; and scaling the reference phase comprises multiplying the reference phase by a scale factor determined by a ratio of the different frequencies.

13. The method of claim 11, wherein:

the sensor interferometer and reference interferometer have different interferometer imbalances; and scaling the reference phase comprises multiplying the reference phase by a scale factor determined by a ratio of the different interferometer imbalances.

14. A method comprising:

interrogating an optical sensor to generate a sensor signal;

interrogating an optical reference device co-located with the sensor to generate a reference signal;

correcting the sensor signal for errors due to Doppler shifts based on the reference signal; and providing a reading of the corrected sensor signal.

15. The method of claim 14, wherein the reference device and sensor share a common lead optical waveguide.

16. The method of claim 14, wherein the reference device and sensor comprise distributed lasers.

17. The method of claim 14, wherein the reference device and sensor comprise interferometers.

18. The method of claim 14, wherein at least one of the reference and sensor comprises an optical waveguide Bragg grating.

19. A sensor system, comprising:

a light source for generating interrogating light signals;

at least one optical sensor optically coupled with the light source, wherein the at least one optical sensor is sensitive to at least one measurand;

at least one optical reference device located in close proximity with the sensor, such that the sensor and the reference device are exposed to substantially equal environmental conditions, and optically coupled with the light source, wherein the at least one optical reference device is insensitive to the at least one measurand; and control circuitry configured to interrogate the sensor with light from the light source to generate a sensor signal, interrogate the reference device with light from the light source to generate a reference signal, extract a sensor optical frequency parameter from the sensor signal, extract a reference optical frequency parameter from the reference signal, and generate a corrected sensor optical frequency parameter based on the sensor and reference optical frequency parameters.

20. The system of claim 19, wherein the at least one optical reference device comprises a sensor laser and the reference optical frequency parameter comprises a laser mode frequency.

21. The system of claim 19, wherein the at least one optical reference comprises an optical waveguide Bragg grating and the reference optical frequency parameter comprises a change in center frequency of the optical waveguide Bragg grating.

22. The system of claim 19, wherein the reference and sensor share a common lead waveguide.

23. The system of claim 19, wherein the control circuitry is configured to scale the reference optical frequency parameter and generate the corrected sensor optical frequency parameter based on the scaled reference optical frequency parameter from the sensor optical frequency parameter.

24. The system of claim 23, wherein the control circuitry is configured to scale the reference optical frequency parameter by multiplying the reference optical frequency parameter by a scaling factor based on a ratio of a frequency of a light signal used to interrogate the sensor and a frequency of a light signal used to interrogate the reference device.

25. The system of claim 19, wherein at least one of the optical sensor and the reference device comprises a sensor laser and at least one of the sensor optical frequency parameter and the reference optical frequency parameter comprises at least one of a laser frequency or a separation in laser frequencies.

26. A sensor system for sensing a downhole parameter, comprising:

a light source for generating interrogating light signals;

at least one sensor interferometer sensitive to the downhole parameter; at least one reference interferometer located in close proximity with the sensor interferometer such that the sensor interferometer and the reference interferometer are exposed to substantially equal environmental conditions and wherein the reference interferometer is configured to be insensitive to the downhole parameter; and control circuitry configured to interrogate the sensor interferometer with light from the light source to generate a sensor signal, interrogate the reference interferometer with light from the light source to generate a reference signal, extract a sensor phase from the sensor signal, extract a reference phase from the reference signal, and generate a corrected sensor phase based on the extracted sensor and reference phases.

27. The system of claim 26, wherein the at least one sensor interferometer and the at least one reference interferometer are located in a wellbore.

28. The system of claim 26, wherein the sensor interferometer and reference interferometer share a common lead waveguide.

29. The system of claim 26, wherein the control circuitry is configured to scale the reference phase and generate the corrected sensor phase based on the sensor phase and the scaled reference phase.

30. The system of claim 29, wherein:

the sensor interferometer and reference interferometer are interrogated with light signals of different frequencies; and the control circuitry is configured to scale the reference phase by multiplying the reference phase by a scale factor determined by a ratio of the different frequencies.

31. The system of claim 29, wherein:

the sensor interferometer and reference interferometer have different interferometer imbalances; and the control circuitry is configured to scale the reference phase by multiplying the reference phase by a scale factor determined by a ratio of the different interferometer imbalances.

* * * * *